(12) United States Patent
Kalbacher

(10) Patent No.: US 8,528,629 B2
(45) Date of Patent: Sep. 10, 2013

(54) HEAT EXCHANGER WITH A FLOW CONNECTOR

(75) Inventor: Klaus Kalbacher, Rangendingen (DE)

(73) Assignee: Modine Manufacturing Company, Racine, WI (US)

( * ) Notice: Subject to any disclaimer, the term of this patent is extended or adjusted under 35 U.S.C. 154(b) by 1013 days.

(21) Appl. No.: 12/307,764

(22) PCT Filed: Jun. 12, 2007

(86) PCT No.: PCT/EP2007/005150
§ 371 (c)(1),
(2), (4) Date: Jan. 7, 2009

(87) PCT Pub. No.: WO2008/006431
PCT Pub. Date: Jan. 17, 2008

(65) Prior Publication Data
US 2009/0314483 A1    Dec. 24, 2009

(30) Foreign Application Priority Data
Jul. 12, 2006  (DE) .......................... 10 2006 032 205

(51) Int. Cl.
*F28D 7/10*   (2006.01)
*F28D 7/06*   (2006.01)
*F28F 9/02*   (2006.01)

(52) U.S. Cl.
USPC ........................... 165/176; 165/140; 165/173

(58) Field of Classification Search
USPC ................... 165/140, 134.1, 153; 137/68.14, 137/599.02
See application file for complete search history.

(56) References Cited

U.S. PATENT DOCUMENTS

| | | | | |
|---|---|---|---|---|
| 2,701,147 A | * | 2/1955 | Summerville | 285/1 |
| 3,776,272 A | * | 12/1973 | Arbon | 137/596 |
| 4,002,201 A | * | 1/1977 | Donaldson | 165/140 |
| 4,685,430 A | * | 8/1987 | Ap | 123/142.5 R |
| 5,421,405 A | * | 6/1995 | Goodin et al. | 165/154 |

(Continued)

FOREIGN PATENT DOCUMENTS

| | | |
|---|---|---|
| DE | 3722248 | 9/1988 |
| EP | 1111217 | 6/2001 |

(Continued)

OTHER PUBLICATIONS

PCT/EP2007/005150 International Search Report and Written Opinion, 10 pages, dated Oct. 16, 2007.

*Primary Examiner* — Allen Flanigan
*Assistant Examiner* — Jason Thompson
(74) *Attorney, Agent, or Firm* — Michael Best & Friedrich LLP

(57) ABSTRACT

The invention relates to a heat exchanger (e.g., a charge air cooler) having a cooling body composed of flat tubes arranged at intervals and having corrugated fins positioned in the intervals. The charge air in the flat tubes can be cooled by cooling air flowing through the corrugated fins. The heat exchanger can include a flow connector and an integrated pre-cooler in which a medium, for example charge air, is cooled by means of a coolant. The pre-cooler/post cooler can be integrated into a section of the cooling body. A flow connector composed of at least two tubular parts which can be plugged one into the other, locked and sealed, can include a partitioning wall extending in one of the parts. At least one inlet connection and/or at least one outlet connection can be arranged on one or the other of the parts.

10 Claims, 3 Drawing Sheets

(56) References Cited

U.S. PATENT DOCUMENTS

| | | | |
|---|---|---|---|
| 5,896,834 A * | 4/1999 | Gruner | 123/41.33 |
| 6,302,147 B1 * | 10/2001 | Rose et al. | 137/614.03 |
| 6,382,678 B1 * | 5/2002 | Field et al. | 285/3 |
| 6,688,292 B2 * | 2/2004 | Ruppel et al. | 123/563 |
| 6,755,158 B2 * | 6/2004 | Knecht et al. | 123/41.56 |
| 6,817,406 B1 * | 11/2004 | Inoue et al. | 165/115 |
| 6,892,803 B2 * | 5/2005 | Memory et al. | 165/165 |
| 6,959,758 B2 * | 11/2005 | Hughes et al. | 165/165 |
| 7,021,669 B1 * | 4/2006 | Lindermeir et al. | 285/86 |
| 7,293,604 B2 * | 11/2007 | Sasaki et al. | 165/165 |
| 7,380,544 B2 * | 6/2008 | Raduenz et al. | 123/568.12 |
| 2005/0172664 A1 * | 8/2005 | Cho et al. | 62/515 |
| 2006/0278377 A1 * | 12/2006 | Martins et al. | 165/140 |
| 2007/0084590 A1 * | 4/2007 | Okumura et al. | 165/164 |
| 2008/0078536 A1 * | 4/2008 | Tolani | 165/134.1 |

FOREIGN PATENT DOCUMENTS

| | | |
|---|---|---|
| EP | 1279805 | 1/2003 |
| GB | 2375388 | 11/2002 |
| JP | 59145325 | 8/1984 |

* cited by examiner

HEAT EXCHANGER WITH A FLOW CONNECTOR

CROSS-REFERENCE TO RELATED APPLICATIONS

Priority is hereby claimed to PCT Patent Application No. PCT/EP2007/005150, filed Jun. 12, 2007, and to German Patent Application No. DE 10 2006 032 205.3, filed Jul. 12, 2006, the entire contents of which are incorporated herein by reference.

FIELD OF THE INVENTION

The present invention relates to a heat exchanger with a flow connector. In some embodiments, the heat exchanger can be a charge air cooler in which charge air is cooled by cooling air, and which has an integrated pre-cooler in which the charge air is cooled by a coolant.

SUMMARY

In some embodiments, the invention relates to a heat exchanger (e.g., a charge air cooler) with a flow connector in which the charge air is cooled by cooling air, and which has an integrated pre-cooler in which the charge air is cooled by a coolant. In addition, the invention relates to a flow connector for heat exchangers.

Some independent aspects of the described charge air cooler are disclosed in JP 59-145325 A. This reference is also described later in other documents and has been partially developed, for example in DE 3 722 248C1 or in WO 02/090739A1 or in DE 101 36 861A1, to name just these three documents.

In conventional applications, a pre-cooler can be integrated in a collecting box of the charge air cooler, which constitutes a suitable measure which has proven itself in practice. However, this design makes it necessary in most cases for the collecting box in which the pre-cooler is integrated to be constructed with relatively large dimensions in order to be able to implement perceptible pre-cooling. Therefore, in particular for passenger car applications, such a way of integrating the pre-cooler is often not the best selection.

One independent object of the invention is to provide a way of integrating the pre-cooler into a heat exchanger, for example a charge air cooler, which is improved for many applications and which requires less installation space and/or which increases in relative terms the space which can be used for exchanging heat but which does not significantly increase the required overall installation space compared to a charge air cooler without an integrated pre-cooler.

In some embodiments, the invention also comprises a flow connector for heat exchangers which supports a compact design of the heat exchanger.

Because the pre-cooler and/or post cooler are integrated in a section of the cooling network or heat exchanger body, it becomes possible to make the collecting boxes of the heat exchanger significantly smaller in relative terms. It is also possible to provide a post cooler of the proposed type in addition to or instead of the pre-cooler. In a pre-cooler, the charge air first flows into it before it can flow into the rest of the charge air cooler. In the case of an integrated post cooler, the charge air first flows into the cooling network of the charge air cooler to which cooling air is applied, and then into the post cooler to which coolant is applied.

The inventor has taken as his starting point the knowledge that collecting boxes or collecting spaces are functionally conditioned, necessary elements of a heat exchanger but they can hardly serve to exchange the heat themselves, for which reason the pre-cooler is supposedly also accommodated there in the prior art. In contrast, the inventor provides collecting boxes which are embodied to be as small, in particular as flat, as possible, and he moves the pre-cooler and/or post cooler out of the collecting box and into the cooling network of the charge air cooler.

The inventor prefers the pre-cooler/post cooler to have flat coolant tubes which are located in the intervals between the flat tubes. The inventor sees advantages in that the pre-cooler/post cooler preferably extends over the entire depth of the cooling network, but only over a small part of the height or length of the cooling network or of the flat tubes. The inventor furthermore prefers the coolant tubes to be arranged transversely with respect to the flat tubes. The inventor finds it correct that the part or the section occupies approximately 5-40% of the cooling network or heat exchanger body.

The inventor is interested in a compact design of his heat exchanger (e.g., a charge air cooler) and in low fabrication costs, and therefore provides for the pre-cooler/post cooler to have just a single flow connector in which the inlet and the outlet are integrated in order, for example, to be able to direct the coolant into the pre-cooler/post cooler and also out of it.

The inventor is of the understandable view that the flow connector is suitable for an entire series of different applications, in particular for heat exchanger applications, and of course also for heat exchangers which do not have any pre-cooler/post cooler. He therefore claims separate protection for this. The flow connector is composed of at least two tubular parts which can be plugged one into the other coaxially, locked and sealed. The flow connector can include a partitioning wall which extends in one of the parts, and wherein at least one inlet connection and/or at least one outlet connection is provided in one or the other of the parts.

One of the tubular parts is attached to at least two openings which are located relatively close to one another in a wall of a collecting box, the collecting box having at least one subdividing wall which divides the collecting box into an inlet part and into an outlet part. The partitioning wall and the subdividing wall lie approximately in one plane. It is also possible to provide for the subdividing wall to serve simultaneously as a partitioning wall. In such cases, the subdividing wall which is arranged in the collecting box would project from a single opening in the wall of the collecting box which then divides this opening into two openings and which extends into a tubular part. For this reason, the claim which relates to the flow connector is to be understood as meaning that the partitioning wall is either attached in a tubular part or is part thereof or merely extends into it. One of the aforementioned openings or an opening part is assigned to the inlet part, and the other opening or another opening part communicates with the outlet part.

The two parts which can be plugged one into the other are relatively similar to the prior art in the seal-forming region and in the locking region, specifically to the so-called VDA couplings which have found widespread applications in particular in the field of automobiles and have proven excellent there (VDA—Verband der deutschen Automobilindustrie [German automobile industry association]). At said location there is typically a conical region which permits the rapid plugging of the two coupling parts one into the other. The parts are locked by means of a securing clip which latches in a groove and which is used, for example, in what are referred to as "quick release couplings". The groove is formed in the wall of one tubular part. In the wall of the other tubular part there are two slits. If the slits correspond to the groove in a plane, the securing clip which is mounted in the slits engages in the groove.

BRIEF DESCRIPTION OF THE DRAWINGS

The invention will be described below with reference to an exemplary embodiment. The description can contain further features, which may under certain circumstances also be essential, and their advantages. In the appended drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
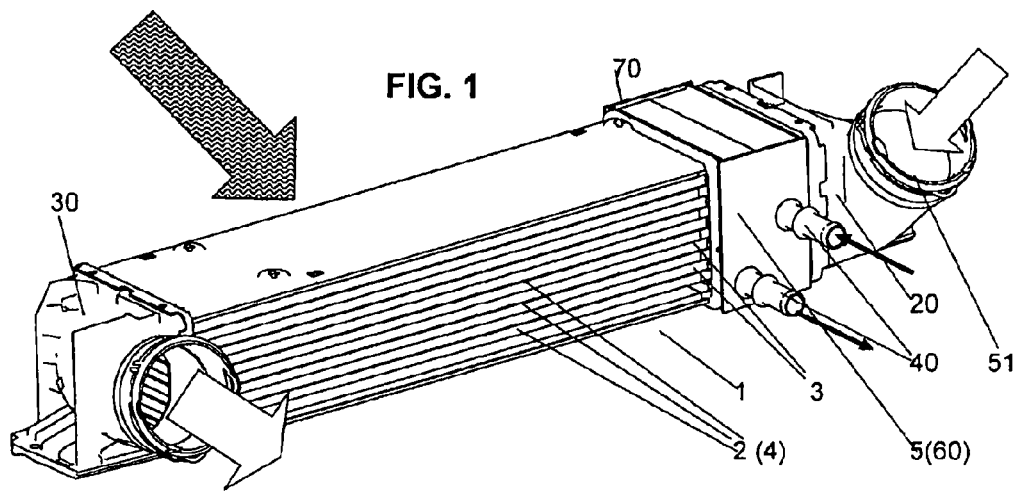
FIG. 1 is a perspective view of a heat exchanger.

The heat exchanger which is illustrated in the figures is an air-cooled charge air cooler with an integrated charge air pre-cooler 5. According to FIGS. 1 and 2, the heat exchanger has a cooling network 1, composed of flat tubes 3 which are arranged at intervals 2, and having corrugated fins 4 in the intervals 2, wherein the charge air in the flat tubes 3 is cooled by means of cooling air which flows through the corrugated fins 4. In FIG. 1, the shaded block arrow indicates the cooling air. The white block arrows indicate the inflowing and outflowing charge air and the dashed arrows indicate the inflowing and outflowing liquid coolant of the pre-cooler 5.

The illustrated heat exchanger also has, as mentioned above, an integrated pre-cooler 5 in which the charge air is cooled by means of the coolant of the motor vehicle engine. Furthermore, the heat exchanger has two flow connectors 51, which have been provided in the exemplary embodiment according to FIGS. 1 and 2 for the connection of a feed line for the charge air to be cooled, and a discharge line for the cooled charge air. The flow connectors 51 provided in this exemplary embodiment are not particular flow connectors 51 but rather such connections from the prior art. In this exemplary embodiment, there are only connectors 40 for connecting coolant hoses on the pre-cooler 5. The connectors 40 are arranged on the collecting box 60 of the pre-cooler 5. At the other end of the pre-cooler 5 there is a deflector box 70. The pre-cooler 5 has been integrated in a section of the cooling network 1, specifically directly at the start of the cooling network 1, that is to say in the direct vicinity of the collecting box 20 for the entering charge air. If the cooler 5 were to be arranged at the opposite side of the heat exchanger, that is to say in the vicinity of the collecting box 30, it could be referred to as a post cooler 5. The integration has been carried out in such a way that the coolant tubes 50 of the pre-cooler 5 are arranged at the aforementioned intervals 2 between the flat tubes 3 of the charge air cooler and of the heat exchanger. They extend transversely with respect to the longitudinal direction of the flat tubes 3. In the flat tubes 3 there are internal inserts 10 which have been indicated in only two flat tubes 3 in FIG. 3. The flat tubes 3 could also have other turbulence-generating configurations instead of the internal inserts 10. The pre-cooler 5 extends, as can be seen, over the entire depth of the cooling network 1, but only over a small part of the height or the length of the cooling network 1.

Figure 3:
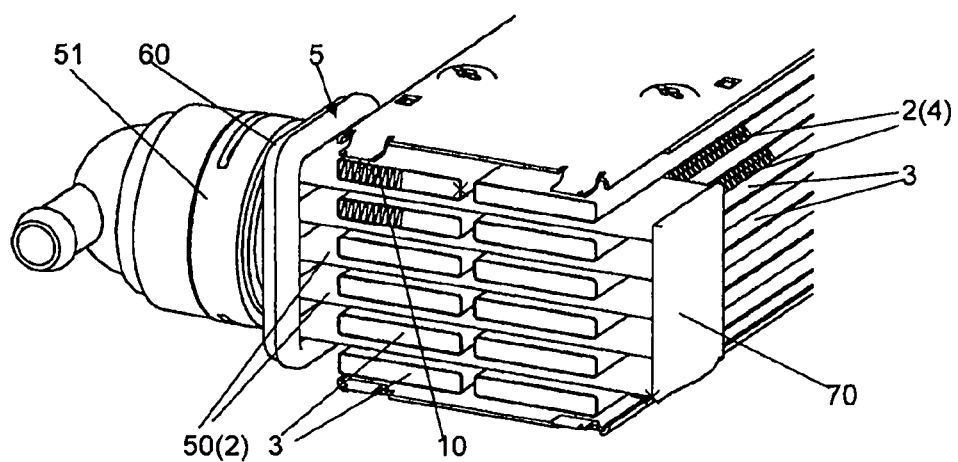
FIG. 3 is a partial view of a heat exchanger with a flow connector.
Figure 4:
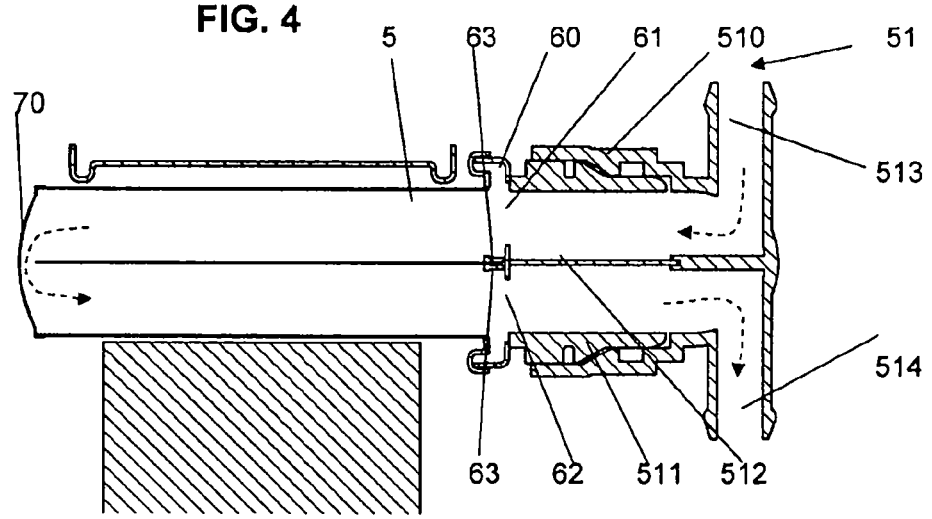
FIG. 4 shows a section through the heat exchanger and the flow connector.

In the exemplary embodiment which is shown in FIGS. 3 and 4, the pre-cooler 5 also has a collecting box 60 and a deflector box 70. In contrast to the exemplary embodiment described above, a single flow connector 51 for the coolant, in which the inlet 513 and the outlet 514 of the collecting box are integrated, has been connected to said collecting box 60.

The flow connector 51 is composed of at least two tubular parts 510, 511 which can be plugged one into the other, locked and sealed, wherein a partitioning wall 512 has been provided in one of the parts 510 or 511. As FIG. 4 shows, the first part 511 has been attached via two openings 61, 62 in the wall of the collecting box 60. The one opening 61 is an inflow opening and the other opening 62 is correspondingly an outflow opening. In FIG. 4, this has been shown by corresponding arrows which are intended to indicate the throughflow. The second coupling part 510 has been plugged coaxially over the first coupling part 511. In an embodiment which is not shown, the first part 511 has been plugged coaxially over the second part 510. The parts 510, 511 are to be locked to one another and sealed, as is actually well known per se with such coupling parts, for which reason no further explanations are necessary here. In the exemplary embodiment shown, the partitioning wall 512 has been attached in the first coupling part 511. Here, the term "attached" comprises all conceivable embodiments, for example used as an integral part and attached or else embodied integrally with one of the coupling parts 510 or 511 or embodied integrally with the subdividing wall 63, etc. The partitioning wall 512 in the exemplary embodiment shown interacts on one side with the second coupling part 510, and on the other side with the wall of the collecting box 60 in order to ensure sufficient separation of the inflow side from the outflow side. The subdividing wall 63, which has already been mentioned and which extends in the collecting box 60 over its length, also serves to separate the aforesaid sides.

With regard to the aforementioned FIG. 4, which shows a horizontal section through the heat exchanger in the region of the pre-cooler 5, it is easy to understand that a series of modifications of the flow connector 51 are conceivable without departing from the meaning of the claim. For example, a single opening could be arranged in the wall of the collecting box 60, with the subdividing wall 63 then having a projection which extends outwards through the single opening and which acts as a partitioning wall 512 in the coupling parts (not shown). The question as to materials can equally remain open because this is decided by a person skilled in the art without effort by reference to the conditions of the specific application. For example, the part 510 could be composed of metal and soldered or welded onto the wall of the metallic collecting box 60. The second part 512 could also be composed of metal or else of plastic. However, the first part 510 could also be composed of plastic and could also be embodied so as to be integral with the wall of the collecting box 60.

Figure 2:
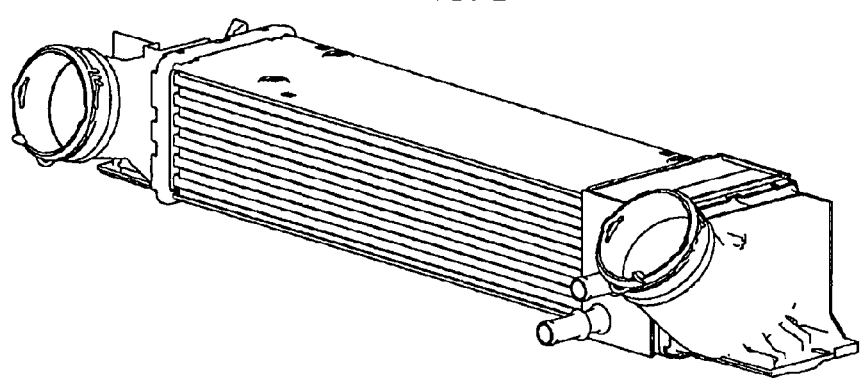
FIG. 2 is a different perspective view of the same heat exchanger.

The flow connector 51 which is shown and described in FIGS. 3 and 4 could easily replace the two connectors 40 from FIG. 1 or 2. In addition, such flow connectors 51 can also advantageously be provided for all heat exchanger applications. They are not at all restricted to use in pre-coolers 5 even if FIGS. 1-4 show the flow connectors 51 only in conjunction with pre-coolers 5 but this is not intended to be a restriction to this.

The proposed flow connector 51 contributes to the compact design of heat exchangers and can lead to cost reductions.

Figure 5:
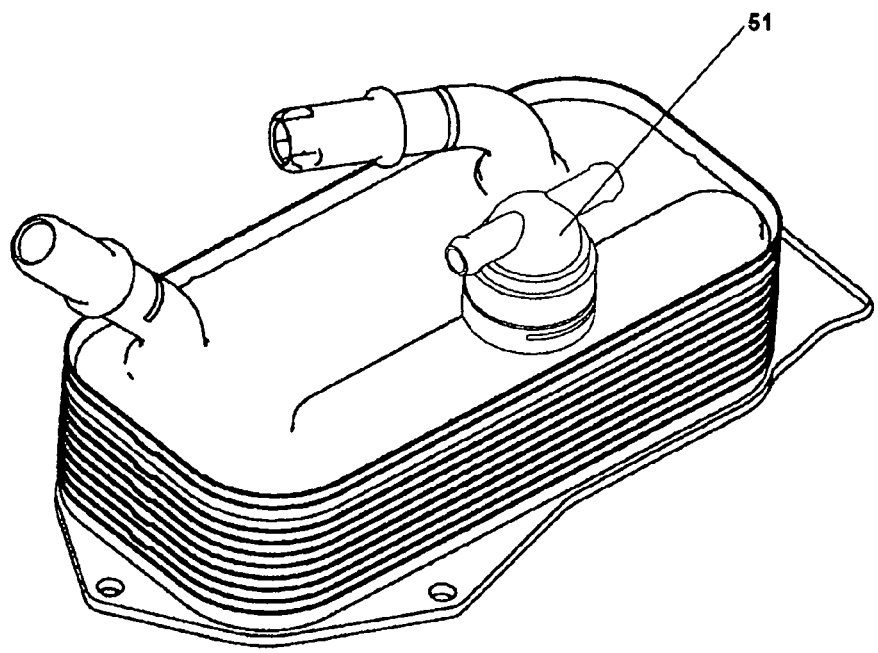
FIG. 5 is a view of another heat exchanger with a flow connector.
Figure 6:
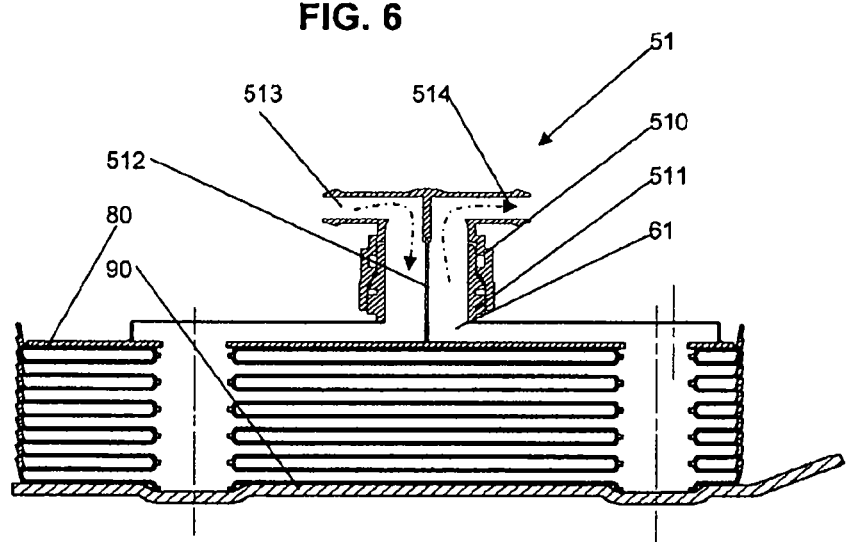
FIG. 6 shows a section through the heat exchanger and the flow connector.

This can also be seen with reference to FIGS. 5 and 6. The two figures show a plate heat exchanger of a type which is known per se and which can be, for example, an oil cooler. A flow connector 51 is arranged on its cover plate 80. This flow connector 51 also has two coupling parts 510 and 511 which engage coaxially one in the other. A partitioning wall 512 ensures that the inflowing medium at the inlet 513 is separated from the outflowing medium at the outlet 514. The inlet 513 and the outlet 514 have also been embodied on the outer coupling part 510 in this exemplary embodiment. The inner coupling part 511 is arranged around an opening 61 which is divided by means of the partitioning wall 512. As is shown by FIG. 5, the plate heat exchanger has two further connectors or the like which are intended for another medium.

Various features and advantages of the invention are set forth in the following claims.

What is claimed is:

1. A heat exchanger comprising:
   a flow connector;
   a cooling body composed of flat tubes, which are arranged at intervals, and having corrugated fins positioned in the intervals, wherein working air is cooled in flat tubes by cooling air which flows through the corrugated fins; and
   an integrated pre-cooler/post cooler in which a medium is cooled by a coolant, wherein the pre-cooler/post cooler is integrated into a section of the cooling body, wherein the pre-cooler/post cooler has coolant tubes, and wherein the flat tubes of the cooling body are interleaved with the coolant tubes of the pre-cooler/post-cooler.

2. The heat exchanger according to claim 1, wherein the coolant tubes of the pre-cooler/post cooler are flat coolant tubes which are located adjacent the corrugated fins.

3. The heat exchanger according to claim 1, wherein the coolant tubes are arranged transversely with respect to the flat tubes.

4. The heat exchanger according to claim 1, wherein the pre-cooler/post cooler extends over the entire depth of the cooling body, but only over a small portion of the height or the length of the cooling body.

5. The heat exchanger according to claim 4, wherein the portion or the section occupies approximately 5-40% of the cooling body.

6. The heat exchanger according to claim 1, wherein the pre-cooler/post cooler has at least one collecting box and one flow connector, wherein an inlet and an outlet of the pre-cooler/post cooler are included in the flow connector.

7. The heat exchanger according to claim 6, wherein the flow connector is composed of at least first and second tubular parts which can be plugged one into the other, locked and sealed, wherein a partitioning wall is arranged in one of the first and second tubular parts, and wherein at least one inlet connection and at least one outlet connection are arranged in one of the first and second tubular parts, and wherein one of the first and second tubular parts is arranged over at least one opening in a wall of the collecting box.

8. The heat exchanger according to claim 6, wherein the collecting box has a subdividing wall which divides said collecting box into an inlet portion and into an outlet portion, wherein one opening communicates with the inlet portion, and the other opening communicates with the outlet portion.

9. The heat exchanger according to claim 7, wherein one of the tubular parts is composed of metal and is soldered onto the wall of the collecting box, and in that the other tubular part can be constructed from plastic.

10. The heat exchanger of claim 1, wherein the heat exchanger is a charge air cooler, and wherein the working air is charge air.

\* \* \* \* \*